Patented Jan. 17, 1950

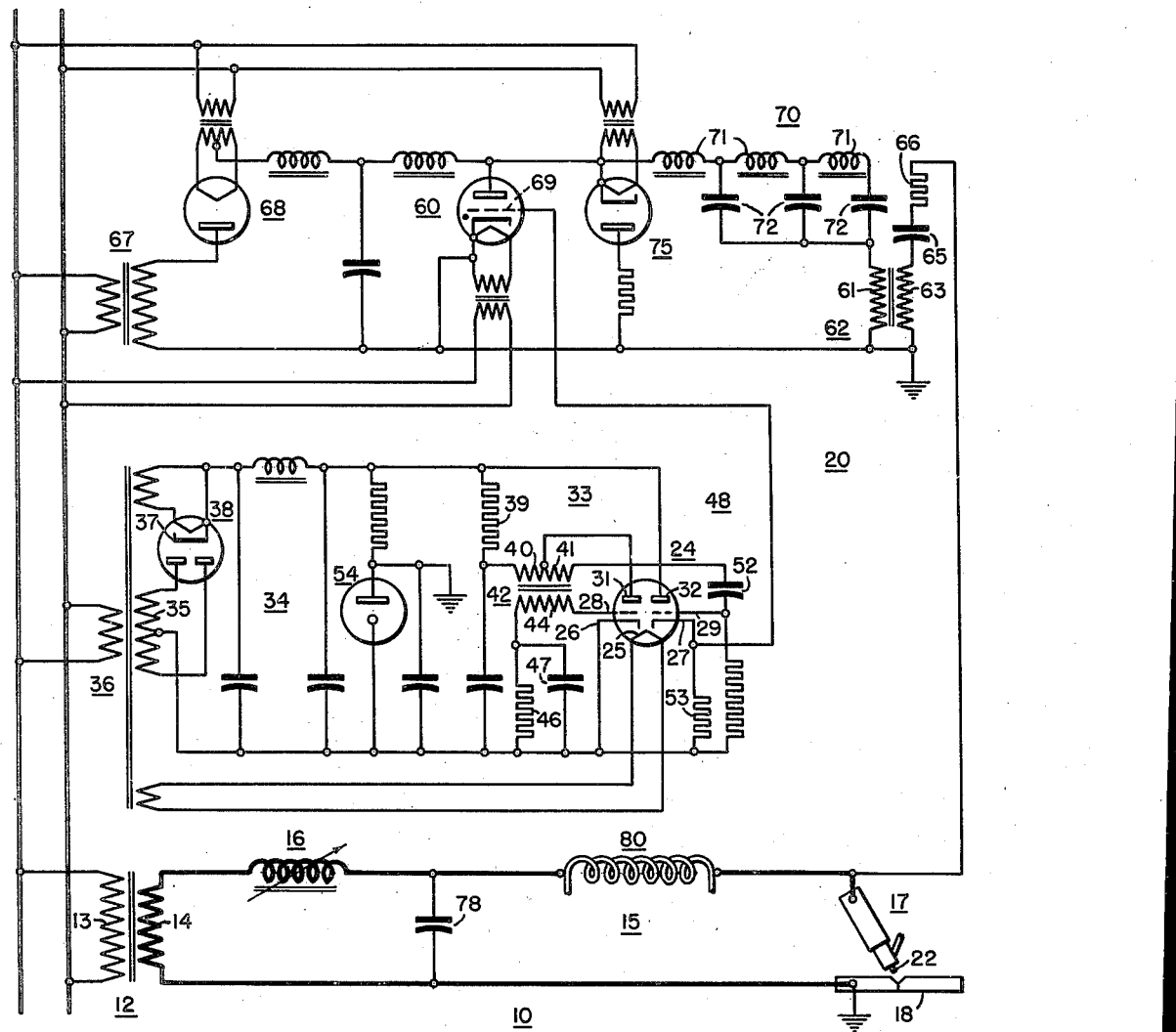

2,495,183

UNITED STATES PATENT OFFICE 2,495,183

ARC WELDING APPARATUS

William L. Roberts, Pittsburgh, Pa., assignor to Westinghouse Electric Corporation, East Pittsburgh, Pa., a corporation of Pennsylvania Application November 3, 1948, Serial No. 58,135

11 Claims. (Cl. 315—246)

My invention relates generally to arc welding apparatus, and it has reference in particular to an arc initiating and stabilizing system for initiating the arc in direct current arc welding systems, and initiating and/or stabilizing the arc in alternating current arc welding systems. While not so limited the system of my invention is particularly adapted for use with such welding systems employing an inert gaseous medium for shielding the arc.

Generally stated, it is an object of my invention to provide an improved arc initiating and stabilizing system which is simple and inexpensive to manufacture, and reliable and effective in operation.

More specifically, it is an object of my invention to provide, in an arc welding system, for producing periodic direct current impulses of controlled amplitude for application to the arc circuit to initiate and stabilize an arc therein.

An important object of my invention is to provide, in an arc initiating and stabilizing system, for reducing the peak value of the impulses after an initial impulse so as to reduce the amount of radio interference.

Another object of my invention is to provide, in an alternating current arc welding system, for initiating and stabilizing the arc with a minimum of radio interference by utilizing an electronic pulse generator which limits the peak current values of the impulses impressed on the arc circuit.

Yet another object of my invention is to provide, in an arc initiating and/or stabilizing system, for utilizing a grid controlled gaseous type discharge device for supplying current impulses of relatively high peak value to an arc circuit for initiating and maintaining an arc therein.

It is an important object of my invention to provide an arc initiating and stabilizing system having a low output impendence so that it is capable of supplying direct current voltage impulses of sufficient amplitude to both initiate an arc under open circuit conditions and maintain it during a welding operation.

One important object of my invention is to provide, in an arc stabilizing system, for applying voltage impulses to an arc circuit during a welding operation having peak values of at least 150 to 250 volts and having durations of the order of two microseconds.

Yet another object of my invention is to provide, in an arc initiating and/or stabilizing system, for utilizing direct current impulses recurring at a rate of about 1500 per second and having a fundamental frequency on the order of from 200 to 500 kilocycles.

Other objects will, in part, be obvious and will, in part, be described hereinafter.

In the past, it has been customary to provide for initiating and stabilizing the arc in alternating current arc welding systems by utilizing stabilizing systems which comprise high frequency generators of the spark gap type. While such stabilizing systems have proven reasonably effective in initiating and stabilizing the arc, they have recently met with much objection because of the relatively large amount of radio interference they cause. This interference appears to result largely from the fact that a very wide band of frequencies is produced in the spark gap itself, much wider than the frequencies utilized in the tuned circuit which is coupled to the welding circuit. In addition, the peak values of current produced by arc stabilizing systems of the spark gap type, are usually relatively high, which also increases the amount of interference.

In practicing my invention in one of its forms, a blocking oscillator circuit is used with a cathode follower to apply periodic direct current voltage impulses to the grid of a grid-controlled gaseous type discharge device connected to provide a discharge circuit through the primary of an impulse transformer. A delay circuit of capacitors and choke devices connected in circuit relation with the primary winding of the impulse transformer and the discharge device, discharges through the discharge device in response to the impulses to form two microsecond impulses, which are applied to an arc welding circuit for initiating and stabilizing the arc.

For a more complete understanding of the nature and scope of my invention, reference may be made to the following detailed description, which may be read in connection with the accompanying drawing, in which the single figure is a diagrammatic view of an arc welding system embodying the invention in one of its forms.

Referring to the drawing, the reference numeral 10 may denote, generally, an alternating current arc welding system wherein a welding transformer 12 having a primary winding 13 and a secondary winding 14 may be used to supply welding current to a welding circuit 15 including a current limiting reactance device 16, a welding torch or holder 17 and work 18 upon which a welding operation is to be performed. An arc initiating and stabilizing system denoted, generally, by the reference numeral 20 may be provided for applying periodic voltage impulses to the welding electrode 22 of the welding torch 17 for initiating and stabilizing an arc between the welding electrode and the workpiece.

In order to provide for producing periodic impulses of direct current, an electron valve 24 of the double triode type may be utilized, having a filament 25, a pair of cathodes 26 and 27, grids 28 and 29 and anodes 31 and 32. The anode 31, grid 28 and cathode 26 may be connected so as to provide a periodic oscillator of the relaxation type, such as, for example, a blocking oscillator circuit 33. The cathode 26 of the blocking oscillator circuit may, for example, be connected to the low side of a source of power 34, for example, the midpoint of the secondary winding 35 of a transformer 36, while the cathode 37 of a rectifier device 38 used in conjunction therewith may be connected to the anode 31 through a resistor 39 to apply a voltage on the order of 300 volts thereto. One portion 40 of the tapped primary winding of a coupling transformer 42 may be connected in circuit relation with the anode 31, and the secondary winding 44 connected in circuit relation with the grid 28 to closely couple the anode and grid circuits so as to produce a blocking voltage on the grid 28 as soon as current commences to flow in the anode-cathode circuit, thereby blocking the oscillator and producing periodic direct current impulses instead of continuous oscillations. A resistor-capacitor circuit comprising a resistor 46 and capacitor 47 determines the decay time of the blocking voltage, and the frequency at which the oscillator conducts, which may for example, be on the order of 1000 to 1800 times per second.

The anode 32, grid 29, and cathode 27 of the valve 24 may be utilized in a cathode follower circuit 48, the grid 29 being connected to the anode circuit of the blocking oscillator through a capacitor 52 and a portion 41 of the primary winding, and a cathode resistor 53 being connected in the cathode circuit. Both the blocking oscillator circuit and the cathode follower circuit may be operated at a negative level by utilizing a voltage regulating glow discharge device 54 across the output circuit of the rectifier device 38 and connecting the anode of the glow discharge device 54 to ground, whereby the grids 28, 29 and cathodes 26, 27 will be connected below ground potential.

The output of the cathode follower circuit 48 may be applied to a gaseous type discharge device 60, which may be of the hydrogen filled type and connected in series circuit relation with the primary winding 61 of an impulse transformer 62, the secondary winding 63 of which may be connected between ground and the welding electrode 22 through a coupling condenser 65 and a current limiting resistor 66. The primary winding 61 may be connected to a source of relatively high direct current voltage which may be produced by means of a high voltage transformer 67 and a rectifier device 68.

By connecting the control grid 69 of the discharge device 60 to the cathode 27 of the cathode follower circuit, the discharge device 69 may be normally biased off by reason of the negative operating level of the blocking oscillator and cathode follower circuits, and may be rendered periodically conductive in response to the impulses produced by the blocking oscillator circuit.

With a view to forming substantially two micro-second impulses, a delay or pulse forming circuit 70 comprising a series-parallel connection of choke devices 71 and capacitors 72 may be connected between the discharge device 60 and the impulse transformer 61. The capacitors 72 will be charged from the rectifier device 68, and will discharge in succession through the choke devices 71 for building up the wave form of the discharge through the impulse transformer when the discharge device 60 is rendered conductive.

A blocking valve 75 may be connected in inverse relation with the discharge device 60 for limiting or preventing the application of a reverse potential to the discharge device 60, upon discharge of the impulse transformer 61, which reverse voltage might cause breakdown of the discharge device in the reverse direction.

A by-pass capacitor 78 may be connected in shunt circuit relation with the welding arc to prevent the high frequency impulses from being impressed on the welding transformer. A high frequency choke device 80 may also be connected in series circuit relation with the welding circuit for blocking the high frequency from the welding transformer.

The blocking oscillator circuit may be disposed to produce unidirectional impulses at a frequency on the order of 1500 per second. By using a discharge device 60 containing hydrogen, which has a relatively short deionizing time, relatively large values of current may be carried (on the order of 100 amperes) without any possibility of the discharge device carrying over between impulses and continuing to conduct.

Each time the discharge device 60 is rendered conductive, the delay circuit 70 is discharged through the primary winding of the impulse transformer 62 and the impulse transformer applies a relatively sharp impulse to the welding circuit for initiating and/or stabilizing an arc between the electrode 22 and the work-piece 18. Because the discharge device 60 has a relatively low output impedance it is capable of producing impulses of sufficient amplitude either for initiating an arc when the welding circuit is open or for maintaining the arc during a welding operation, and the amplitude thereof is little affected by the existence of an arc between the work and the welding electrode.

From the above description and the accompanying drawing, it will be apparent that I have provided in a simple and effective manner for initiating and/or stabilizing the arc in alternating current arc welding systems. A stabilizing system embodying the features of my invention produces a minimum of radio interference since the high frequency impulses are readily controllable, and the band of frequencies produced by the oscillator may be limited to a relatively narrow band. Since the power supply for the blocking oscillator circuit does not need to utilize a high reactance transformer, the coupling of the oscillator to the power circuit will be greatly reduced from the value realized when a high reactance transformer has to be used. By utilizing a gaseous type discharge device for applying the voltage impulses to the welding circuit, I am able to both initiate and maintain the arc with impulses having peak values not in excess of 100 amperes, since the amplitude is not appreciably affected under welding conditions because of the relatively low output impedance of the gaseous type discharge device. By utilizing impulses having a fundamental frequency on the order of 200–500 kilocycles per second, and a choke device 80 having an inductance on the order of 15 millihenries, the amount of power required to stabilize the arc is reduced to a low value, since most of the high frequency power is actually utilized at the welding electrode.

Since certain changes may be made in the above-described construction, and different embodiments of the invention may be made without departing from the spirit and scope thereof, it is intended that all the matter contained in the above description and shown in the accompanying drawing shall be considered as illustrative, and not in a limiting sense.

I claim as my invention:

1. The combination with an arc welding system comprising circuit means disposed to effect a supply of continuous welding current to an arc circuit including an electrode and work upon which a welding operation is to be performed, of a pulse generator having a gaseous discharge device disposed to be triggered to produce periodic impulses of direct current coupled to the arc circuit, and control means including an oscillator of the relaxation type connected to trigger the pulse generator.

2. In combination with an arc welding system including an electrode and work disposed to be connected in circuit relation with a continuous current source of welding current, a pulse generator comprising a gaseous discharge device connected between the electrode and the work disposed to be triggered to apply periodic voltage impulses to the electrode having amplitudes on the order of at least 150–250 volts and durations on the order of 2 microseconds, and an oscillator of the relaxation type connected to trigger the pulse generator.

3. The combination with an arc welding system having an arc welding circuit including an arc welding electrode and a workpiece, of a blocking oscillator and a cathode follower, and a direct current pulse generator including a gaseous type discharge tube controlled by the blocking oscillator, said pulse generator being coupled to the arc welding circuit to produce arc stabilizing voltage impulses between the electrode and work.

4. In combination with an arc welding system wherein a source of welding current is connected to an arc electrode by a variable impedance device and also to work upon which a welding operation is to be performed, a blocking oscillator, a pulse generator including a gaseous type grid-controlled discharge device responsive to pulses from the blocking oscillator, circuit means connecting the output of the grid-controlled discharge device to the arc electrode, and a high frequency choke device connected in circuit relation with the electrode and the welding transformer between the source and said circuit means.

5. The combination with an arc welding circuit including a welding transformer connected to supply alternating current to an electrode and work upon which a welding operation is to be performed, of a triggered pulse generator including a gaseous discharge device, and circuit means connecting the gaseous discharge device to the arc welding circuit including a delay circuit comprising a plurality of choke devices and capacitors connected in series-parallel relation.

6. For use in initiating and stabilizing an arc in an arc circuit, a grid-controlled gaseous discharge device, circuit means connecting the discharge device to the arc circuit including a delay circuit comprising a parallel-series circuit of capacitors and choke devices, and a pulse generator including a blocking oscillator connected to apply a periodic direct current impulse to the grid of the discharge device.

7. In combination with an arc welding circuit, an impulse transformer having a secondary winding conected to the arc welding circuit and a primary winding connected to a source of high potential, a gaseous type discharge device connected in shunt relation with the primary winding, a blocking oscillator connected to apply direct current impulses to the discharge device to render it conductive periodically at a frequency of about 1200–1500 impulses per second.

8. An arc initiating and/or stabilizing system for use with an arc welding circuit comprising, an impulse transformer connected to the arc circuit, a delay circuit connecting the impulse transformer to a source of direct current voltage, a grid-controlled gas discharge valve connected in shunt circuit relation with the delay circuit and the impulse transformer, and a blocking oscillator connected to apply direct current impulses to the grid of the discharge device at a frequency on the order of 1000–1800 pulses per second.

9. An arc stabilizing system comprising, a pulse transformer having a secondary winding disposed to be connected to an arc circuit and a primary winding connected to a high voltage source of direct current, a gaseous type discharge device connected in shunt relation with the impulse transformer, a delay circuit connected in circuit relation with the impulse transformer and discharge device to form substantially rectangular 2 microsecond impulses, and control means including a valve device operating as a blocking oscillator and cathode follower connected to apply voltage impulses to the discharge device.

10. In an arc stabilizing system, a high frequency choke device disposed to be connected in an arc circuit, an impulse transformer having a secondary winding connected on the arc side of the choke device and a primary winding disposed to be connected to a source of direct current voltage, a gaseous type discharge device connected between the impulse transformer and the source, a control valve connected in inverse-parallel relation with the discharge valve, and a blocking oscillator connected to apply periodic voltage impulses to the gaseous type discharge device.

11. An arc initiating and stabilizing system comprising, a radio frequency choke device disposed to be connected in an arc circuit between a source of arc current and an arc electrode, an impulse transformer having one winding disposed to be connected to the arc circuit between the choke device and the electrode, and another winding disposed to be connected to a high voltage source of direct current, a grid-controlled discharge device of the gaseous type connected in shunt circuit relation with the impulse transformer and the source, a delay circuit connected between the discharge device and the impulse transformer, and a blocking oscillator and cathode follower circuit connected to apply a periodic direct current voltage to the grid of the gaseous discharge device.

WILLIAM L. ROBERTS.

REFERENCES CITED

The following references are of record in the file of this patent:

UNITED STATES PATENTS

| Number | Name | Date |
| --- | --- | --- |
| 1,982,327 | Smith | Nov. 27, 1934 |
| 2,235,385 | Rava | Mar. 18, 1941 |